United States Patent
Floyd et al.

(10) Patent No.: US 9,121,301 B2
(45) Date of Patent: Sep. 1, 2015

(54) THERMAL ISOLATION APPARATUS

(75) Inventors: Donald Earl Floyd, Greenville, SC (US); David Martin Johnson, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 714 days.

(21) Appl. No.: 13/425,029

(22) Filed: Mar. 20, 2012

(65) Prior Publication Data
US 2013/0251515 A1    Sep. 26, 2013

(51) Int. Cl.
F01D 11/18    (2006.01)
F01D 9/04    (2006.01)

(52) U.S. Cl.
CPC . F01D 11/18 (2013.01); F01D 9/04 (2013.01); F05D 2300/502 (2013.01)

(58) Field of Classification Search
CPC ........... F01D 9/04; F01D 9/041; F01D 11/08; F01D 11/12; F01D 11/122; F01D 11/18
USPC ........ 415/170.1, 173.1, 173.6, 134, 136, 177, 415/175
See application file for complete search history.

(56) References Cited

U.S. PATENT DOCUMENTS

| 5,562,408 | A | | 10/1996 | Proctor et al. |
| 6,120,242 | A | * | 9/2000 | Bonnoitt et al. ................. 415/9 |
| 7,195,452 | B2 | | 3/2007 | Allan et al. |
| 7,946,807 | B2 | | 5/2011 | Phililppot |
| 2004/0179937 | A1 | * | 9/2004 | Kreis et al. ................. 415/170.1 |
| 2009/0010758 | A1 | | 1/2009 | Wunderlich |
| 2010/0104416 | A1 | * | 4/2010 | Willett, Jr. ..................... 415/48 |
| 2010/0266391 | A1 | * | 10/2010 | Schlichting et al. ....... 415/173.1 |

FOREIGN PATENT DOCUMENTS

| DE | 102008007321 A1 | 8/2009 |
| EP | 2182173 A2 | 5/2010 |
| EP | 2570615 A1 | 3/2013 |

OTHER PUBLICATIONS

Search Report and Written Opinion from EP Application No. 13159007.7 dated Jun. 17, 2013.

* cited by examiner

Primary Examiner — Edward Look
Assistant Examiner — Juan G Flores

(57) ABSTRACT

A thermal isolation apparatus is provided and includes an annular casing surrounding a turbine bucket stage and defining an annular recess from an interior facing surface thereof, an annular shroud disposed within the casing to provide for a predefined clearance about rotating bucket tips of the turbine bucket stage, the shroud including an annular main member and an annular flange extending from an outwardly facing surface of the main member and being sized to fit within the recess and a thermal barrier formed of porous material, which is interposed between opposing surfaces of the casing and the flange within the recess.

20 Claims, 2 Drawing Sheets

ID APPARATUS

BACKGROUND OF THE INVENTION

The subject matter disclosed herein relates to a thermal isolation apparatus.

In gas turbine engines, working fluid is directed into a turbine where the energy of the working fluid is converted into mechanical energy used in the production of electricity. This is achieved by having the working fluid aerodynamically interact with rotatable turbine buckets at various stages of the turbine such that the turbine buckets at each stage rotated about a rotor coupled to a generator. Typically, the rotating buckets are encased within a turbine casing having a shroud that provides a clearance about the rotating turbine bucket tips. Since the working fluid normally has a high temperature and since the casing and the shroud are exposed to the working fluid, the casing and the shroud often experience thermal expansion during turbine operations. This expansion can lead to damage and loss of efficiency. It is, thus, often important to control thermal flows between the casing and the shroud.

Such control has previously required that the shroud be machined, which may be a time consuming process that does not guarantee uniform thermal boundary conditions and does not generally improve shroud sensitivity to heating and cooling.

BRIEF DESCRIPTION OF THE INVENTION

According to one aspect of the invention, a thermal isolation apparatus is provided and includes an annular casing surrounding a turbine bucket stage and defining an annular recess from an interior facing surface thereof, an annular shroud disposed within the casing to provide for a predefined clearance about rotating bucket tips of the turbine bucket stage, the shroud including an annular main member and an annular flange extending from an outwardly facing surface of the main member and being sized to fit within the recess and a thermal barrier formed of porous material, which is interposed between opposing surfaces of the casing and the flange within the recess.

According to another aspect of the invention, a thermal isolation apparatus is provided and includes an annular casing surrounding a turbine bucket stage and defining an annular recess from an interior facing surface thereof, an annular shroud disposed within the casing to provide for a predefined clearance about rotating bucket tips of the turbine bucket stage, the shroud including an annular main member and an annular flange extending from an outwardly facing surface of the main member and being sized to fit within the recess and an array of discrete thermal barriers formed of porous material, which are each coupled to the flange and thereby interposed between opposing surfaces of the casing and the flange within the recess.

According to yet another aspect of the invention, a thermal isolation apparatus is provided and includes an annular casing surrounding a turbine bucket stage and defining an annular recess from an interior facing surface thereof, an annular shroud disposed within the casing to provide for a predefined clearance about rotating bucket tips of the turbine bucket stage, the shroud including an annular main member and an annular flange extending from an outwardly facing surface of the main member and being sized to fit within the recess and first and second thermal barrier rings formed of porous material, which are each coupled to the casing and thereby interposed between opposing surfaces of the casing and the flange within the recess.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
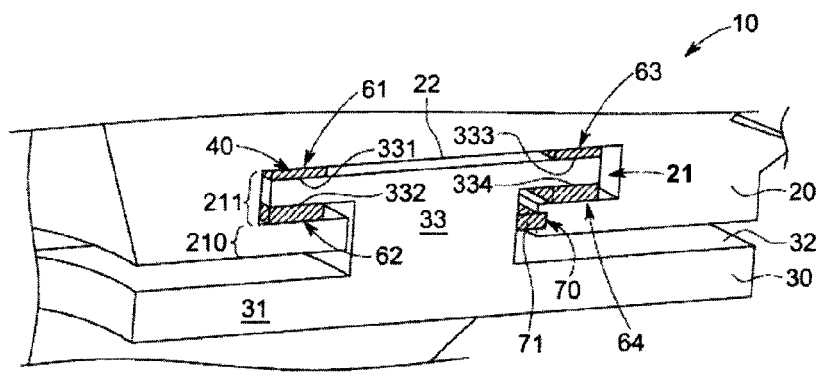
FIG. 1 is a perspective view of a thermal isolation apparatus in accordance with embodiments.

The detailed description explains embodiments of the invention, together with advantages and features, by way of example with reference to the drawings.

DETAILED DESCRIPTION OF THE INVENTION

With reference to FIGS. 1-4, a thermal isolation apparatus 10 is provided and includes an annular casing 20, an annular shroud 30 and a thermal barrier 40. The casing 20 may be disposed to surround a turbine bucket stage of, for example, a turbine section of a gas turbine engine and is formed to define an annular recess 21 from an interior facing surface 22 thereof. The shroud 30 may be disposed within the casing 20 to provide for a predefined clearance about rotating bucket tips of the turbine bucket stage and includes an annular main member 31 having an outwardly facing surface 32 and an annular flange 33. The flange 33 extends radially outwardly from the outwardly facing surface 32 of the main member 31 and is sized to fit within the recess 21. The thermal barrier 40 is formed of porous material and may be interposed between opposing surfaces of the casing 20 and the flange 33 within the recess 21.

Figure 2:
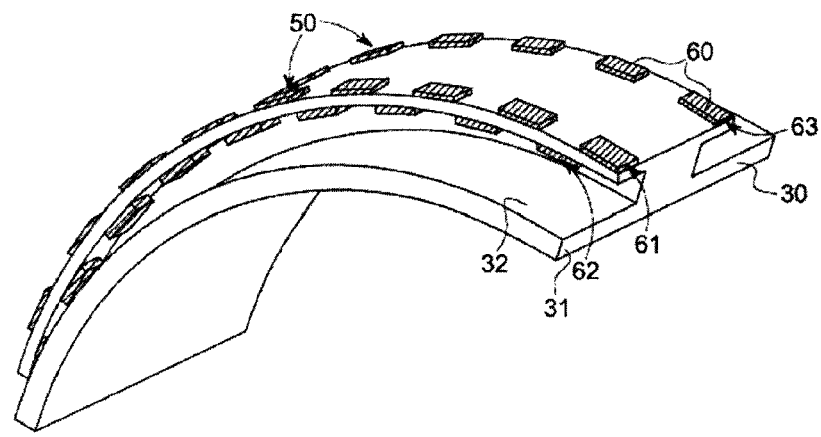
FIG. 2 is a perspective view of a shroud of the thermal isolation apparatus of FIG. 1.
Figure 3:
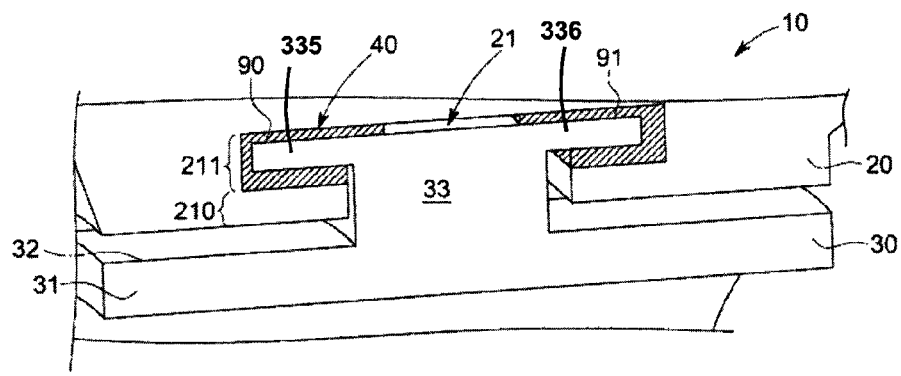
FIG. 3 is a perspective view of a thermal isolation apparatus in accordance with alternative embodiments.
Figure 4:
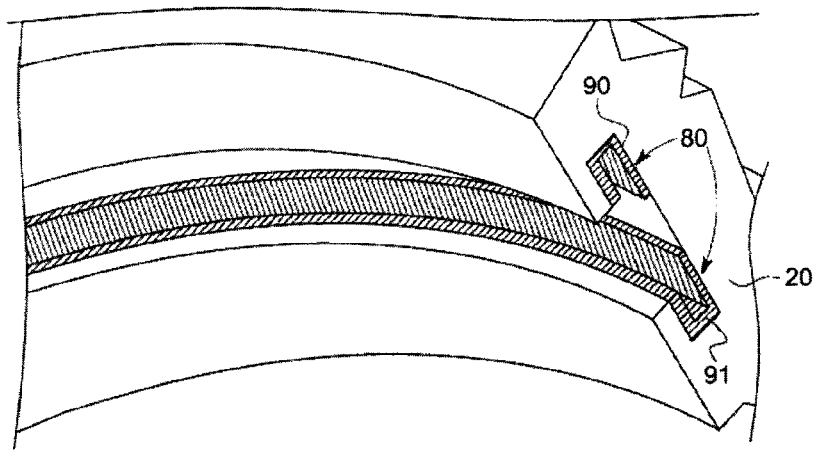
FIG. 4 is a perspective view of a casing of the thermal isolation apparatus of FIG. 3.

In accordance with embodiments, as shown in FIGS. 1 and 3, the recess 21 may be defined to have an inner radial section 210 having a first axial length and an outer radial section 211 having a second radial length that is longer than the first radial length. Similarly, as shown in FIGS. 2 and 4, the flange 33 may have a T-shaped cross section that is sized and shaped to fit within the recess 21. With this configuration, the opposing surfaces at which the thermal barrier 40 may be located include those opposing surfaces of the casing 20 and the shroud 30 having normal angles oriented along a radial dimension and those opposing surfaces of the casing 20 and the shroud 30 having normal angles oriented along an axial dimension.

It is to be understood that the recess 21 and the flange 33 may have other shapes and sizes besides those described herein, which are merely exemplary. For example, the flange 33 may be a straight member or an L-shaped member with the recess 21 having respectively corresponding shapes. In some embodiments, the recess 21 may have a different shape from the flange 33. For example, the shape of the recess 21 may be more geometrically complex than that of the flange 33.

As will be described below, the thermal barrier 40 may be coupled or, more particularly, braze coupled to one of the shroud 30 and the casing 20. In either case, a material of the thermal barrier 40 may have a coefficient of thermal expansion (CTE) that is substantially similar to a material of the one of the shroud 30 and the casing 20. In accordance with embodiments, a material of the thermal barrier 40 may include one or more of a nickel-based superalloy and ceramic and/or other similar materials.

With reference to FIGS. 1 and 2, the thermal barrier 40 may include an array 50 of discrete thermal barriers 60. Each discrete thermal barrier 60 is formed of porous material and is coupled (i.e., braze coupled) to the flange 33 such that each discrete thermal barrier 60 is thereby interposed between opposing surfaces of the casing 20 and the flange 33 within the recess 21. As mentioned above, the recess 21 may have inner radial section 210 and outer radial section 211 and the flange 33 may have a T-shaped cross section. In the embodiments illustrated in FIGS. 1 and 2, the array 50 of discrete thermal barriers 60 includes a first set 61, a second set 62, a third set 63 and a fourth set 64 of discrete thermal barriers 60. The discrete thermal barriers 60 of the first set 61 are arranged with substantially uniform separation along a radially outwardly facing forward wing surface 331 of the flange 33. The discrete thermal barriers 60 of the second set 62 are arranged with substantially uniform separation along a radially inwardly facing forward wing surface 332 of the flange 33. The discrete thermal barriers 60 of the third set 63 are arranged with substantially uniform separation along a radially outwardly facing aft wing surface 333 of the flange 33. The discrete thermal barriers 60 of the fourth set 64 are arranged with substantially uniform separation along a radially inwardly facing aft wing surface 334 of the flange 33. The discrete thermal barriers 60 of the first and third sets 61 and 63 may be circumferentially staggered with respect to those of the second and fourth sets 62 and 64, respectively, to encourage mechanical contact at interfacing surfaces. The configuration described above forms gaps between the discrete thermal barriers 60. These gaps increase a flow area to thereby reduce an overall heat transfer coefficient of the thermal isolation apparatus 10.

The casing 20 may be further formed to define a pocket 70 along a radially oriented wall of the casing 20 at the inner radial section 210. A ring 71 may then be coupled to the casing 20 along the braze pocket 70 at the inner radial section 210. The ring 71 may be formed of porous material that may be braze coupled to the casing 20 along the braze pocket 70 at the inner radial section 210. Alternatively, the ring 71 may be formed of any sealing materials and need not be brazed coupled to the casing 20. With this configuration, the discrete thermal barriers 60 impede thermal flow from the shroud 30 to the casing 20 and vice versa in the radial direction while the ring 71 impedes thermal flow from the shroud 30 to the casing 20 and vice versa in the axial direction to thereby achieve substantially uniform thermal boundary conditions.

With reference to FIGS. 3 and 4, the thermal isolation apparatus 10 may be provided in alternative embodiments, which will be described in detail below. These alternative embodiments include several features that are similar to those of FIGS. 1 and 2, which are described in detail above. These features need not be described again.

As shown in FIGS. 3 and 4, the thermal barrier 40 is provided as a pair of annular rings 80 including a first thermal barrier ring 90 and a second thermal barrier ring 91. The first thermal barrier ring 90 extends annularly through the casing 20 and is disposed in an annular forward section of the recess 21 such that the first thermal barrier ring 90 encompasses a forward wing 335 of the flange 33. Similarly, the second thermal barrier ring 91 extends annularly through the casing 20 and disposed in an annular aft section of the recess 21 such that the second thermal barrier ring 91 encompasses an aft wing 336 of the flange 33. Both the first thermal barrier ring 90 and the second thermal barrier ring 91 are formed of porous material and each may be coupled (i.e., braze coupled) to the casing 20. The pair of annular rings 80 is thereby interposed between opposing surfaces of the casing 20 and the flange 33 within the recess 21. With this configuration, the pair of annular rings 80 may be configured to impede thermal flow from the shroud 30 to the casing 20 and vice versa in both radial and axial directions to thereby achieve substantially uniform thermal boundary conditions.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A thermal isolation apparatus, comprising:
an annular casing surrounding a turbine bucket stage and defining an annular recess from an interior facing surface thereof;
an annular shroud disposed within the casing to provide for a predefined clearance about rotating bucket tips of the turbine bucket stage, the shroud including an annular main member and an annular flange extending from an outwardly facing surface of the main member and being sized to fit within the recess; and
plural thermal barriers formed of porous material, which are respectively interposed between opposing surfaces of the casing and radially inward and outward facing surfaces of forward and aft wings of the flange within the recess.

2. The thermal isolation apparatus according to claim 1, wherein the recess has an inner radial section having a first axial length and an outer radial section having a second radial length that is longer than the first radial length.

3. The thermal isolation apparatus according to claim 2, wherein the flange has a T-shaped cross section.

4. The thermal isolation apparatus according to claim 1, wherein the opposing surfaces comprise:
surfaces of the casing and the shroud having normal angles oriented along a radial dimension; and
surfaces of the casing and the shroud having normal angles oriented along an axial dimension.

5. The thermal isolation apparatus according to claim 1, wherein the thermal barrier is coupled to one of the shroud and the casing.

6. The thermal isolation apparatus according to claim 5, wherein a material of the thermal barrier has a coefficient of thermal expansion (CTE) that is substantially similar to a material of the one of the shroud and the casing.

7. The thermal isolation apparatus according to claim 5, wherein a material of the thermal barrier is braze coupled to the one of the shroud and the casing.

8. The thermal isolation apparatus according to claim 1, wherein a material of the thermal barrier comprises one of a nickel-based superalloy and ceramic.

9. A thermal isolation apparatus, comprising:
an annular casing surrounding a turbine bucket stage and defining an annular recess from an interior facing surface thereof;
an annular shroud disposed within the casing to provide for a predefined clearance about rotating bucket tips of the turbine bucket stage, the shroud including an annular main member and an annular flange extending from an outwardly facing surface of the main member and being sized to fit within the recess; and
multiple arrays of discrete thermal barriers formed of porous material, which are each coupled to the flange and thereby respectively interposed between opposing surfaces of the casing and radially inward and outward facing surfaces of forward and aft wings of the flange within the recess.

10. The thermal isolation apparatus according to claim 9, wherein the recess has an inner radial section having a first axial length and an outer radial section having a second radial length that is longer than the first radial length.

11. The thermal isolation apparatus according to claim 10, wherein the flange has a T-shaped cross section.

12. A thermal isolation apparatus, comprising:
an annular casing surrounding a turbine bucket stage and defining an annular recess from an interior facing surface thereof;
an annular shroud disposed within the casing to provide for a predefined clearance about rotating bucket tips of the turbine bucket stage, the shroud including an annular main member and an annular flange extending from an outwardly facing surface of the main member and being sized to fit within the recess; and
an array of discrete thermal barriers formed of porous material, which are each coupled to the flange and thereby interposed between opposing surfaces of the casing and the flange within the recess,
wherein the recess has an inner radial section having a first axial length and an outer radial section having a second radial length that is longer than the first radial length, and
wherein the array of discrete thermal barriers comprises:
a first set of discrete thermal barriers arranged with substantially uniform separation along a radially outwardly facing forward wing surface of the flange;
a second set of discrete thermal barriers arranged with substantially uniform separation along a radially inwardly facing forward wing surface of the flange;
a third set of discrete thermal barriers arranged with substantially uniform separation along a radially outwardly facing aft wing surface of the flange; and
a fourth set of discrete thermal barriers arranged with substantially uniform separation along a radially inwardly facing aft wing surface of the flange.

13. The thermal isolation apparatus according to claim 12, wherein the first and third sets of discrete thermal barriers are circumferentially staggered with respect to the second and fourth sets of the discrete thermal barriers, respectively.

14. The thermal isolation apparatus according to claim 12, further comprising a ring coupled to the casing at the inner radial section.

15. The thermal isolation apparatus according to claim 9, wherein a discrete thermal barrier material comprises one of a nickel-based superalloy and ceramic.

16. A thermal isolation apparatus, comprising:
an annular casing surrounding a turbine bucket stage and defining an annular recess from an interior facing surface thereof;
an annular shroud disposed within the casing to provide for a predefined clearance about rotating bucket tips of the turbine bucket stage, the shroud including an annular main member and an annular flange extending from an outwardly facing surface of the main member and being sized to fit within the recess; and
first and second thermal barrier rings formed of porous material, which are each coupled to the casing and thereby interposed between opposing surfaces of the casing and the flange within the recess.

17. The thermal isolation apparatus according to claim 16, wherein the recess has an inner radial section having a first axial length and an outer radial section having a second radial length that is longer than the first radial length.

18. The thermal isolation apparatus according to claim 17, wherein the flange has a T-shaped cross section.

19. The thermal isolation apparatus according to claim 17, wherein the first thermal barrier ring comprises a ring member disposable about a forward wing of the flange and the second thermal barrier ring comprises a ring member disposable about an aft wing of the flange.

20. The thermal isolation apparatus according to claim 16, wherein a material of the first and second thermal barrier rings comprises one of a nickel-based superalloy and ceramic.

* * * * *